UNITED STATES PATENT OFFICE.

SEVERIN MORGENSTERN, OF CHARLOTTENBURG, GERMANY.

PROCESS FOR OBTAINING ALCOHOLS OR ALCOHOLIC MATTERS FROM WOOL-FAT.

991,874.

No Drawing.

Specification of Letters Patent. Patented May 9, 1911.

Application filed October 25, 1910. Serial No. 588,963.

*To all whom it may concern:*

Be it known that I, SEVERIN MORGENSTERN, a subject of the King of Prussia, and resident of 1ᵇ Kirchstrasse, Charlottenburg, in the German Empire, have invented a certain new and useful Process for Obtaining Alcohols or Alcoholic Matters from Wool-Fat, of which the following is a specification.
This invention consists in a process for obtaining chemically pure alcohols or alcoholic matters from wool fat in a cheap and commercial manner.

The process depends upon the distillability of unrectified alcohols from wool fat. Up till now the raw wool fat has merely been subjected to distillation with the result that a mixture of free fatty acids, free alcohols and hydrocarbons was obtained, a mixture which in itself is very impure and in which the alcohols therein contained do not even seem to be identical with the alcohols of wool fat, in so far that at high temperatures their physical properties are altered.
While the pure wool fat alcohol bodies obtained by analysis are very viscous, this property has been almost lost in the alcohols of the distillation mixture obtained by distilling raw wool fat.
Heretofore attempts have been made analytically to isolate the wool fat alcohols by precipitation methods as well as by synthetic methods for instance acetylization or benzoylization; but such methods cannot of course come into question for commercial purposes because of the cost. No purification by distillation on a commercial scale of the alcohols has heretofore been carried out, because the saponification product of the wool fat has always been treated first. In fact saponified wool fat mixtures, wherein also part of the alcohols has been freed, could not in the form heretofore known be distilled at least not in the sense that commercially useful products were obtained, but there were obtained strongly colored and strongly smelling distillates which had been rendered very impure by products of decomposition. Now the applicant has found that this phenomenon depends upon the fact that in previous saponifications, too much neutral fat has been left undecomposed, and therefore the raw alcohol mixtures were produced with a great amount of neutral fat.
Such mixtures yield in the lower fractions very impure distillates, and the higher fractions do not approach chemical purity, but are so altered by greasy and tarry products as not to possess their characteristics. The applicant has furthermore found that if distillation commences with a raw product, wherein the neutral fats have been decomposed as much as possible, undecomposed products can be obtained even up to the highest fractions. If a raw alcohol mixture contains say not more than 2 to 3 per cent. of neutral (*i. e.* unsaponified) constituent parts, it is possible to obtain distillates of almost chemical purity up to and including the last fractions, and when the distillation is carried on with care the mixture can be fractionated in a vacuum in an excellent manner.

The applicant has found that 10 to 15 per cent. of neutral fat is the highest limit for obtaining useful products. When such quantities are present the highest fractions begin to show a brown color and to be rendered impure by products of decomposition, but nevertheless the approximate quantitative yield of alcohols is obtained.

Preferably in carrying out my improved process I saponify the wool fat with the amount of alkali necessary to decompose most of the wool fat so that not more than 10 to 15 per cent. of neutral fat is present in the product. The amount of alkali required may readily be determined by empirical or analytical methods. The product thus obtained is then directly subjected to distillation in a vacuum and preferably in the presence of steam, and by this means the alcohols (*e. g.* myricin alcohol, cholesterin etc.) are readily and directly obtained from the saponified wool fat. The nature of the alcohols obtained depends of course upon the particular nature of the wool fat.

The mode of producing the raw alcoholic mixture forms no part of this invention. It is only of importance that a mixture be manufactured as raw material for the distillation process which does not contain more than about 10 to 15 per cent. of neutral fat. The distillation itself must be carried out with care under the highest possible vacuum and with as little admission of superheated steam as possible in order to prevent a lowering of the vacuum and therewith a sudden rise in temperature. When these precau-
11 tions are observed, the process goes on quietly and the distillates pass over without decomposition while a small residue of pitch remains behind.

The raw alcohol mixture may be obtained in various ways. Saponification may be carried on to a considerable degree with lime under pressure, which has the advantage that lime soap is obtained at once, from which the raw alcohols may be easily separated by extraction. Still better is it to saponify by means of alcoholic alkali. In this case it is best to employ the alcoholic residuum resulting in the manufacture of lanolin, which only requires to have alkali added, and then heat applied. As the spirit is again recovered by distillation and as the alkali may for instance be recovered by decomposing the soap with hydrofluoric acid, there is nothing to hinder the alcoholic saponification from any economic point of view.

I claim:—

1. A process for obtaining alcohols from wool fats which consists in saponifying the raw wool fat until less than 15 per cent. of neutral fat is present in the product and in thereafter without further purification subjecting the product to distillation *in vacuo*.

2. A process for obtaining alcohols from wool fats, which consists in saponifying the raw wool fat until less than 15 per cent. of neutral fat is present in the product, in thereafter without further purification subjecting the product to distillation *in vacuo* and in the presence of steam.

3. A process for obtaining alcohols from wool fats which consists in saponifying the raw wool fat until less than 15 per cent. of neutral fat is present in the product, in thereafter without further purification subjecting the product to distillation *in vacuo* and in the presence of superheated steam.

In witness whereof I have hereunto set my hand in the presence of two witnesses.

SEVERIN MORGENSTERN.

Witnesses:
HENRY HASPER,
WOLDEMAR HAUPT.